US011464069B2

(12) United States Patent
Mbonye et al.

(10) Patent No.: US 11,464,069 B2
(45) Date of Patent: Oct. 4, 2022

(54) COMMUNICATIONS NETWORK

(71) Applicant: Apple Inc., Cupertino, CA (US)

(72) Inventors: Gahima S. Mbonye, San Jose, CA (US); Daniel P. Ellis, Cupertino, CA (US); Gregory R. Nelson, Los Altos, CA (US); Prashant H. Vashi, Sunnyvale, CA (US); Sergey Sitnikov, San Jose, CA (US); Vikram B. Yerrabommanahalli, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/595,260

(22) Filed: Oct. 7, 2019

(65) Prior Publication Data

US 2021/0014932 A1 Jan. 14, 2021

Related U.S. Application Data

(60) Provisional application No. 62/871,585, filed on Jul. 8, 2019.

(51) Int. Cl.
*H04W 80/10* (2009.01)
*H04W 4/14* (2009.01)
(Continued)

(52) U.S. Cl.
CPC ............ *H04W 80/10* (2013.01); *H04W 4/14* (2013.01); *H04W 4/20* (2013.01); *H04W 36/0027* (2013.01); *H04W 88/182* (2013.01)

(58) Field of Classification Search
CPC ......... H04W 80/10; H04W 4/14; H04W 4/20; H04W 36/0027; H04W 88/182
See application file for complete search history.

(56) References Cited

U.S. PATENT DOCUMENTS 8,543,107 B1 9/2013 Bertz et al.
9,197,696 B1 * 11/2015 Jakatdar .................. H04L 67/10
(Continued)

FOREIGN PATENT DOCUMENTS

CN 101127940 A 2/2008
CN 108235823 A 6/2018

OTHER PUBLICATIONS

Correction on SIP Response, SA WG2 Meeting #94, New Postcom, Nov. 2012, New Orleans, US.

*Primary Examiner* — Liton Miah
(74) *Attorney, Agent, or Firm* — Treyz Law Group, P.C.; Michael H. Lyons

(57) ABSTRACT

A communications network may be used to convey Short Message Service (SMS) messages using the Internet Protocol (IP). User equipment may transmit an SMS-over-IP Session Initiation Protocol (SIP) message to wireless equipment over a high-bandwidth communications link. The wireless equipment may route the SMS-over-IP SIP message to the ePDG. When the high-bandwidth link is unavailable, the user equipment may transmit a compressed message to the proxy server over a low-bandwidth communications link. The proxy server may convert the compressed message into an SMS-over-IP SIP message that is transmitted to the ePDG. The proxy server may serve as a proxy for the first user equipment from the perspective of the ePDG. This may allow SMS message data to continue to be conveyed through the communications network even when the high-bandwidth communications link becomes unavailable.

20 Claims, 8 Drawing Sheets

(51) Int. Cl.
  *H04W 4/20* (2018.01)
  *H04W 88/18* (2009.01)
  *H04W 36/00* (2009.01)

(56) References Cited

U.S. PATENT DOCUMENTS

| | | | | |
|---|---|---|---|---|
| 9,477,701 | B1* | 10/2016 | Kundu | H04W 4/14 |
| 9,749,152 | B2* | 8/2017 | Stupar | H04L 12/5692 |
| 2004/0199649 | A1* | 10/2004 | Tarnanen | H04L 69/40 |
| | | | | 709/230 |
| 2005/0174935 | A1* | 8/2005 | Segel | H04W 88/06 |
| | | | | 370/228 |
| 2006/0019659 | A1* | 1/2006 | Rosenberg | H04W 60/00 |
| | | | | 455/432.1 |
| 2006/0084417 | A1* | 4/2006 | Melpignano | H04L 12/5692 |
| | | | | 455/418 |
| 2006/0291419 | A1* | 12/2006 | McConnell | H04L 65/1043 |
| | | | | 370/331 |
| 2008/0159232 | A1* | 7/2008 | Thalanany | H04W 36/0016 |
| | | | | 370/332 |
| 2010/0195644 | A1* | 8/2010 | Hao | H04W 36/0022 |
| | | | | 370/352 |
| 2013/0120168 | A1 | 5/2013 | Kumar et al. | |
| 2015/0350983 | A1* | 12/2015 | Kwok | H04W 24/10 |
| | | | | 370/331 |
| 2016/0127914 | A1* | 5/2016 | Starck | H04L 67/02 |
| | | | | 455/466 |
| 2019/0230221 | A1* | 7/2019 | Archer | H04L 51/22 |

* cited by examiner

COMMUNICATIONS NETWORK

This application claims the benefit of provisional patent application No. 62/871,585, filed Jul. 8, 2019, which is hereby incorporated by reference herein in its entirety.

FIELD

This relates generally to communications networks, and, more particularly, to communications networks for conveying Short Message Service (SMS) messages.

BACKGROUND

Communications networks are used to convey data messages between first user equipment and second user equipment. The data messages often include text-based messages such as Short Message Service (SMS) messages. SMS messages are conveyed between the first user equipment and a carrier core network by a cellular base station (i.e., using radio-frequency signals in a cellular telephone frequency band).

Many communications networks have SMS-over-IP capabilities in which an SMS message to or from carrier-authorized first user equipment is included in an SMS-over-IP message conveyed over the internet or other networks that operate using the Internet Protocol (IP). A network carrier that manages the carrier core network also operates a carrier Evolved Packet Data Gateway (ePDG) that is communicatively coupled to the carrier core network. The SMS-over-IP messages are conveyed between the first user equipment and the carrier ePDG through the Internet as well as additional networks not operated by the carrier such as a local wireless access point (i.e., using radio-frequency signals in a wireless local area network frequency band).

The ability to convey SMS message data between the first user equipment and the second user equipment typically depends upon the availability of a first wireless communications link between the first user equipment and the cellular base station or a second communications link between the first user equipment and the Internet. If care is not taken, the first user equipment and the second user equipment may be unable to convey SMS message data through the communications network when the first and second communications links are unavailable.

SUMMARY

A communications network may be used to convey Short Message Service (SMS) message data between first and second user equipment using the Internet Protocol (IP). The communications network may include Internet-supplying networking equipment such as a router or a wireless access point, a proxy server, and an Evolved Packet Data Gateway (ePDG). The first user equipment may wirelessly transmit an SMS-over-IP Session Initiation Protocol (SIP) message that includes SMS message data over a first communications link between the first user equipment and the Internet-supplying networking equipment. The internet-supplying networking equipment may route the SMS-over-IP SIP message to the ePDG through the Internet. The SMS-over-IP SIP message may, for example, be transmitted over a network tunnel that overlies the wireless equipment, the Internet, and the first communications link and that terminates at the ePDG and the first user equipment.

The first user equipment may determine when the first communications link is unavailable (e.g., when the first user equipment is out of range of the wireless equipment or when the Internet is unavailable). When the first communications link is unavailable, the first user equipment may encapsulate the SMS message data to form a compressed message. The first user equipment may wirelessly transmit the compressed message to the proxy server over a second communications link having a bandwidth that is less than that of the first communications link. The proxy server may convert the compressed message into an SMS-over-IP SIP message. For example, the proxy server may de-encapsulate and decompress the compressed message to recover the SMS message data. The proxy server may then re-encapsulate the SMS message data to generate the SMS-over-IP SIP message. The proxy server may transmit the SMS-over-IP SIP message to the ePDG (e.g., over a network tunnel that terminates at the proxy server and the ePDG).

This process may be reversed to receive SMS message data transmitted by the second user equipment at the first user equipment. The carrier ePDG may transmit the SMS message from the second user equipment to the proxy server in an SMS-over-IP SIP message. The proxy server may convert the SMS-over-IP SIP message received from the ePDG into a compressed message that is provided to the first user equipment over the second communications link. The SMS-over-IP SIP messages conveyed by the proxy server may be indistinguishable to the carrier ePDG from the SMS-over-IP messages conveyed through the wireless equipment. In this way, the proxy server may serve as a proxy for the first user equipment from the perspective of the ePDG when the first communications link is unavailable. This may allow SMS message data to continue to be conveyed between the first and second user equipment even when the first communications link is unavailable.

DETAILED DESCRIPTION

Figure 1:
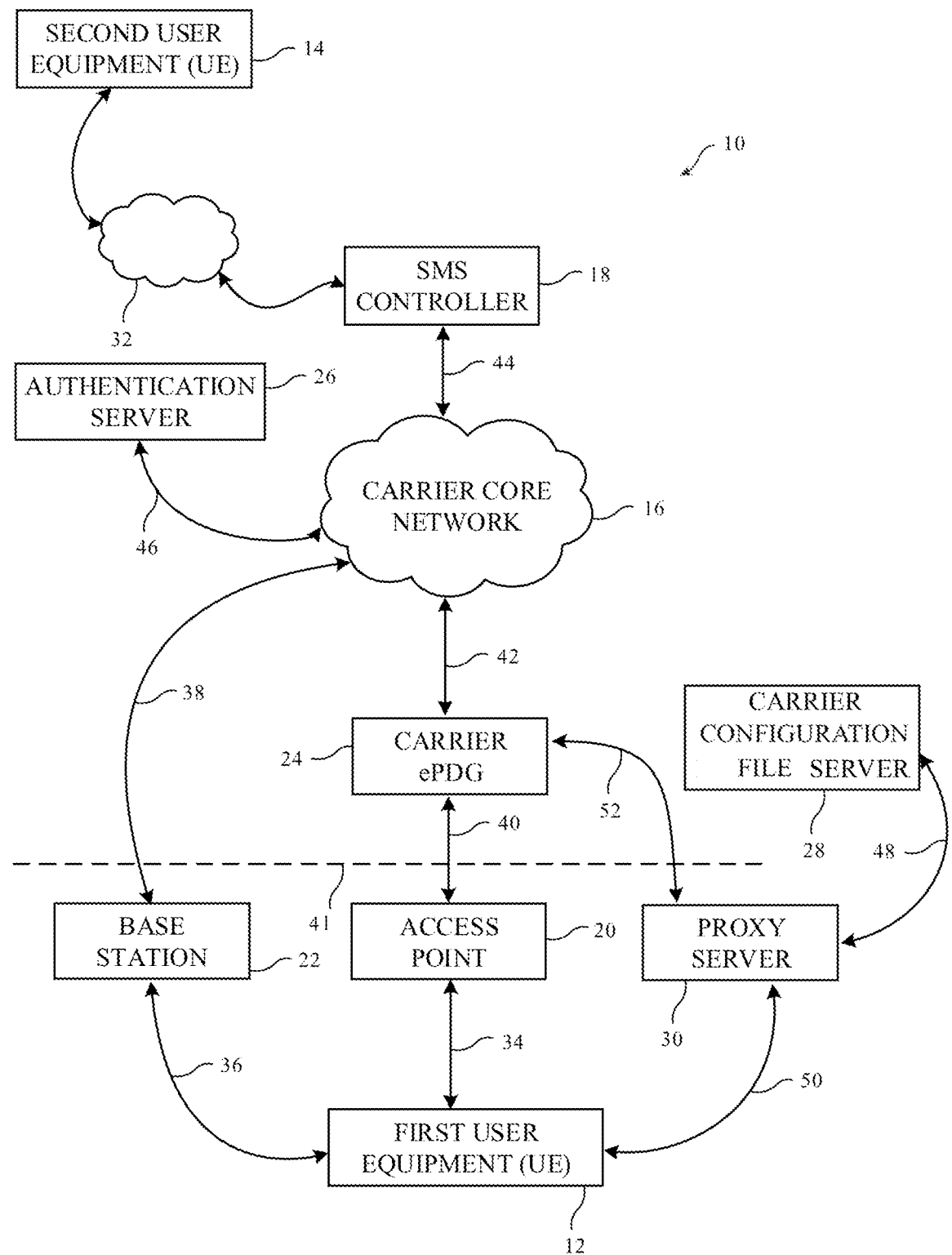
FIG. 1 is a schematic diagram of an illustrative communications network that conveys Short Message Service (SMS) message data in accordance with some embodiments.

A communications network may include first user equipment and second user equipment. The first user equipment may transmit messages to the second user equipment and may receive messages from the second user equipment. The communications network may include a carrier core network that is operated by a network carrier or service provider. The communications network may also include a carrier Evolved Packet Data Gateway (ePDG) that is operated by the network carrier.

The communications network may convey message data such as Short Message Service (SMS) message data between the first and second user equipment. The SMS message data may be included in SMS messages that are conveyed between the carrier core network and the first user equipment via a cellular base station (e.g., over a cellular telephone communications link). The SMS message data may also be included in SMS-over-IP messages that are conveyed by the communications network using the Internet Protocol (IP). SMS-over-IP messages may be conveyed between the carrier core network and the first user equipment via the carrier ePDG and a wireless access point (e.g., the SMS-over-IP messages may be conveyed between the wireless access point and the first user equipment over a wireless local area network communications link). If desired, the SMS-over-IP messages may also be conveyed between the carrier core network and the first user equipment via the carrier ePDG and the cellular base station (e.g., in scenarios where the cellular telephone communications link is capable of conveying SMS-over-IP messages). The SMS-over-IP messages are Session Initiation Protocol (SIP) messages and may therefore sometimes be referred to herein as SMS-over-IP SIP messages or simply as SIP messages.

The cellular telephone communications link and the wireless local area network communications link are high-bandwidth communications links that support relatively high data rates (e.g., 100 kB/s or more, 1 MB/s or more, 10 MB/s or more, 1 GB/s or more, etc.). The communications network may also include a proxy server that communicates with the first user equipment over a low-bandwidth communications link. The low-bandwidth communications link may operate using relatively low data rates (e.g., 100 kB/s or less, 10 kB/s or less, 1 kB/s or less, or other data rates that are lower than the data rates of the high-bandwidth communications links). The first user equipment may still be able to communicate with the proxy server over the low-bandwidth communications link when the first user equipment is unable to communicate over the high-bandwidth communications links (e.g., when the first user equipment has moved out of range of the cellular base station and wireless access point or when the Internet is unavailable).

When the high-bandwidth communications links are unavailable to the first user equipment, the communications network may establish and authenticate a logical network path between the first user equipment and the carrier ePDG via the proxy server and the low-bandwidth communications link. The logical network path may include a first path between the first user equipment and the proxy server and a second path that includes a secure network tunnel between the proxy server and the carrier ePDG. Once the logical network path has been established, the first user equipment may generate a compressed message that includes SMS message data to convey to the second user equipment. The first user equipment may generate the compressed message by encapsulating the SMS message data using a compression algorithm associated with the low-bandwidth communications link. The first user equipment may transmit the compressed message to the proxy server over the low-bandwidth communications link.

The proxy server may unpack (de-encapsulate) the SMS message data from the compressed message using a decompression algorithm associated with the low-bandwidth communications link. The proxy server may re-pack (re-encapsulate) the unpacked SMS message data to produce an SMS-over-IP SIP message. The proxy server may transmit the SMS-over-IP SIP message to the carrier ePDG (e.g., over the secure network tunnel), which conveys the SMS-over-IP SIP message or the SMS message data from the SMS-over-IP message to the carrier core network. The carrier core network may provide the SMS-over-IP SIP message or the SMS message data from the SMS-over-IP SIP message to an SMS controller. The SMS controller may forward the SMS message data to the second user equipment (e.g., as an SMS message or SMS-over-IP message conveyed to the second user equipment over a different carrier core network or the same carrier core network). To the carrier ePDG, the SMS-over-IP SIP message received from the proxy server may appear indistinguishable from SMS-over-IP SIP messages conveyed to the carrier ePDG via the cellular base station and the wireless access point. This process may be reversed to convey SMS message data from the second user equipment to the first user equipment via the proxy server and the low-bandwidth communications link when the high-bandwidth communications links are unavailable.

FIG. 1 is a schematic diagram of an illustrative communications network (system) 10 for conveying SMS message data or other message data between first user equipment (UE) 12 and second user equipment 14. As shown in FIG. 1, communications network 10 may include carrier core network 16, carrier ePDG 24, authentication server 26, SMS controller 18, network portion 32, carrier configuration file server 28, proxy server 30, one or more cellular base stations 22, and one or more wireless access points 20. Cellular base station 22 and/or wireless access point 20 may be omitted if desired. Cellular base station 22 and wireless access point 20 may sometimes be referred to collectively herein as high-bandwidth wireless equipment or simply as wireless equipment.

First user equipment 12 may communicate with cellular base station 22 over a high-bandwidth communications link such as high-bandwidth communications link 36. Cellular base station 22 may communicate with carrier core network 16 over data path 38. If desired, cellular base station 22 may communicate with carrier ePDG 24 over a corresponding data path (not shown in FIG. 1 for the sake of clarity). First user equipment 12 may communicate with wireless access point 20 over a high-bandwidth communications link such as high-bandwidth communications link 34. Wireless access point 20 may communicate with carrier ePDG 24 over data path 40. Carrier ePDG 24 may communicate with carrier core network 16 over data path 42. Proxy server 30 may communicate with carrier ePDG 24 over data path 52 and may communicate with carrier configuration file server 28 over data path 48. Carrier core network 16 may communicate with authentication server 26 over data path 46 and may communicate with SMS controller 18 over data path 44.

Data paths 38, 40, 42, 44, 46, 48, and 52 may sometimes be referred to herein as communications paths or communications data paths. Data paths 38, 40, 42, 44, 46, 48, and 52 may each include one or more wired communications links (e.g., communications links formed using cabling such as ethernet cables, radio-frequency cables such as coaxial cables or other transmission lines, optical fibers or other optical cables, etc.), one or more wireless communications links (e.g., short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc.), switches, routers, servers, modems, repeaters, telephone lines, network cards, line cards, communications gateways, portals, user equipment (e.g., computing devices, mobile devices, etc.), wireless access points, base stations, some or all of a network of communications (network) nodes or terminals coupled together using these components or other components (e.g., some or all of a mesh network, relay network, ring network, local area network, wireless local area network, personal area network, cloud network, star network, tree network, or networks of communications nodes having other network topologies), the Internet, combinations of these, etc.

SMS controller 18 may communicate with second user equipment 14 over network portion 32. Network portion 32 may include one or more communications links, data paths, wireless access points, cellular base stations, proxy servers, carrier ePDGs, carrier core networks, and/or carrier configuration file servers. Carrier network 16 and carrier ePDG 24 of FIG. 1 may be operated by a corresponding network carrier or service provider. In one suitable arrangement, network portion 32 may include a carrier core network, carrier ePDGs, and other components that are operated by a different network carrier than the network carrier associated with carrier core network 16 and carrier ePDG 24. In another suitable arrangement, network portion 32 may be operated by the same network carrier or service provider as carrier core network 16 and carrier ePDG 24 (e.g., network portion 32 may include one or more of carrier core network 16, carrier ePDG 24, cellular base station 22, wireless access point 20, carrier configuration file server 28, and data paths 38, 40, 42, 44, and 46 in a scenario where second user equipment 14 and first user equipment 12 both subscribe to the same network carrier).

High-bandwidth communications links 36 and 34 may support data transfer using relatively high data rates (e.g., 100 kB/s or more, 1 MB/s or more, 10 MB/s or more, 1 GB/s or more, etc.). High-bandwidth communications links 36 and 34 may each include respective high-bandwidth wireless communications links. For example, high-bandwidth communications link 36 may include a cellular telephone communications link that wirelessly conveys data using a cellular telephone frequency band (e.g., a wireless communications link maintained using a cellular telephone radio access technology such as 4G LTE, GSM, UMTS, etc.). High-bandwidth communications link 34 may include a wireless local area communications link that wirelessly conveys data using a wireless local area network frequency band (e.g., a wireless communications link maintained using a wireless local area network radio access technology such as Wi-Fi®). In this example, the high-bandwidth wireless communications links in high-bandwidth communications links 36 and 34 are short range wireless communications links that operate over a range of inches, feet, or tens of feet, or medium range wireless communications links that operate over a range of hundreds of feet, thousands of feet, miles, or tens of miles. This is merely illustrative and, if desired, high-bandwidth communications links 34 and/or 36 may include long range wireless communications links that operate over a range of hundreds or thousands of miles, etc.

In practice, first user equipment 12 may only communicate using high-bandwidth communications links 36 and 34 when user equipment 12 is located within range of cellular base station 22 or wireless access point 20. When user equipment 12 is located outside the range of cellular base station 22 and wireless access point 20 (or whenever high-bandwidth communications links 36 and 34 are otherwise unavailable), first user equipment 12 may communicate with carrier ePDG 24 via proxy server 30 and low-bandwidth communications link 50. First user equipment 12 and proxy server 30 may be able to convey data over low-bandwidth communications link 50 even when high-bandwidth communications links 34 and 36 are unavailable. Proxy server 30 may be implemented on a computer, server, or any other computing equipment. If desired, proxy server 30 may be implemented on a distributed computer system such as a cloud-based computer network. For example, proxy server 30 may be logically defined as a virtual machine or server that is implemented (distributed) across two or more underlying physical computers, servers, network terminals, network nodes, or other computing equipment at one or more geographic locations.

Low-bandwidth communications link 50 may support data transfer using a relatively low data rate (e.g., 100 kB/s or less, 10 kB/s or less, 1 kB/s or less, or other data rates that are less than the data rates supported by high-bandwidth communications links 34 and 36). In other words, low-bandwidth communications link 50 may support data transfer using relatively low bandwidths (and/or data rates) that are lower than the relatively high bandwidths (and/or data rates) supported by high-bandwidth communications links 34 and 36. Low-bandwidth communications link 50 may include one or more low-bandwidth wireless communications links (e.g., wireless communications links that convey data using the relatively low bandwidth and data rate). The low-bandwidth wireless communications links in low-bandwidth communications link 50 may be short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc. The low-bandwidth wireless communications links may wirelessly convey data over any desired frequency bands (e.g., frequency bands that are different from the frequency bands handled by high-bandwidth communications links 34 and 36 or one or more of the same frequency bands as those handled by high-bandwidth communications links 34 and 36). Low-bandwidth communications link 50 may be a direct connection between first user equipment 12 and proxy server 30 or may include multiple network nodes that convey data using at least one low-bandwidth wireless communications link and one or more other wireless or wired communications links. For example, low-bandwidth communications link 50 may include a relay network, a mesh network, a star network, a tree network, a ring network, a local area network, a wireless local area network, combinations of these, and/or a network of network nodes having other network topologies.

First user equipment 12 and second user equipment 14 may convey text-based message data such as SMS message data over communications network 10. The SMS message data may be included in SMS messages and/or SMS-over-IP SIP messages (e.g., the SMS message data may form a data payload for the SMS messages or SMS-over-IP SIP messages and may include text or other input generated by software applications running on the user equipment or provided by a user via input/output devices on or coupled to the user equipment). The SMS messages may include an SMS header in addition to the SMS message data. The SMS-over-IP SIP messages may include an SMS header and other headers such as an IP Multimedia Subsystem (IMS) header in addition to the SMS message data. Communications network 10 may use the SMS header in the SMS messages and the SMS and IMS headers in the SMS-over-IP SIP messages to help determine where to route the SMS message data to reach a desired message destination.

When first user equipment 12 is in range of cellular base station 22, first user equipment 12 may transmit an SMS message to cellular base station 22 over high-bandwidth communications link 36. Cellular base station 22 may relay the SMS message to carrier core network 16 over data path 38. Carrier core network 16 may transmit the SMS message data from the SMS message to SMS controller 18 over data path 44. SMS controller 18 may convey the SMS message data to second user equipment 14 via network portion 32.

When first user equipment 12 is in range of wireless access point 20, first user equipment 12 may transmit an SMS-over-IP SIP message to wireless access point 20 over high-bandwidth communications link 34. Wireless access point 20 may route the SMS-over-IP SIP message to carrier ePDG 24 over data path 40. Carrier ePDG 24 is a node or gateway that is communicatively coupled to carrier core network 16 via data path 42. Carrier ePDG may transmit the SMS-over-IP SIP message to carrier core network 16 over data path 42. Carrier core network 16 may parse and process the SMS-over-IP SIP message and may convey the SMS-over-IP SIP message or the corresponding SMS message data from the SMS-over-IP SIP message to SMS controller 18. SMS controller 18 may convey the SMS message data to second user equipment 14 via network portion 32.

A secure network tunnel such as an Internet Protocol Security (IPSec) tunnel may be established between carrier ePDG 24 and first user equipment 12 (through wireless access point 20) using authentication information (e.g., security keys or other information) stored at authentication server 26. The SMS-over-IP SIP message may be conveyed between first user equipment 12 and carrier ePDG 24 over the IPSec tunnel (e.g., via the underlying high-bandwidth communications link 34, wireless access point 20, and data path 40). If desired, the SMS-over-IP SIP message may additionally or alternatively be conveyed between first user equipment 12 and carrier ePDG 24 via cellular base station 22 and high-bandwidth communications link 36 (e.g., in scenarios where high-bandwidth communications link 36 is a cellular telephone communications link capable of conveying SMS-over-IP messages such as a 4G LTE link). These processes may be reversed to receive SMS message data at first user equipment 12 (e.g., SMS message data transmitted by second user equipment 14).

When high-bandwidth communications links 36 and 34 are unavailable to first user equipment 12, first user equipment 12 may convey SMS message data using low-bandwidth communications link 50 and proxy server 30 instead of using high-bandwidth communications links 36 and 34, cellular base station 22, and wireless access point 20. Information stored at authentication server 26 and carrier configuration file server 28 may be used in establishing and securing a logical network path between first user equipment 12 and carrier ePDG 24. The logical network path may include one or more secure network tunnels such as a first network tunnel between first user equipment 12 and proxy server 30 (e.g., SMS message data conveyed over low-bandwidth communications link 50 may be encapsulated using a protocol associated with low-bandwidth communications link 50) and a second network tunnel between proxy server 30 and carrier ePDG 24 (e.g., an IPSec tunnel). Proxy server 30 may convert the SMS message data between a low-bandwidth format associated with low-bandwidth communications link 50 and a high-bandwidth format associated with data path 52 (e.g., an SMS-over-IP SIP message). Proxy server 30 and low-bandwidth communications link 50 may allow for seamless or near-seamless communications between second user equipment 14 and first user equipment 12 using SMS-over-IP messages even when high-bandwidth communications links 36 and 34 become unavailable to first user equipment 12.

The example of FIG. 1 is merely illustrative. First user equipment 12 and second user equipment 14 may convey SMS-over-IP information whenever first user equipment 12 is connected to a network that can communicate via the Internet Protocol with carrier ePDG 24. For example, first user equipment 12 may be communicatively coupled to a network that has high speed IP connectivity to carrier ePDG 24 such as an access point connected to the public Internet. However, first user equipment 12 need not communicate with carrier ePDG via the public Internet. In other words, access point 20 may be an access point with Internet access or may be hardwired to a private IP network that is directly connected to the carrier (e.g., data path 40 may include the public Internet or a private IP network). For example, access point 20 may be a subscriber identity module (SIM)-based Internet of Things (IoT) device hard-wired to a corporate network that peers with the carrier. In this example, access point 20 may be a device with no Internet or wireless capability but that still conveys SMS-over-IP information between first user equipment 12 and carrier ePDG 24. High-bandwidth communications link 34 may be replaced by a wired link and need not be wireless in this or in other examples.

While low-bandwidth communications link 50 is described herein as being a low-bandwidth link, the methods described herein may be used for any second communications link (e.g., in place of low-bandwidth communications link 50 of FIG. 1) that does not fit the criteria of being able to connect to a network that has high speed IP connectivity to carrier ePDG 24 (e.g., via access point 20) and that is not connected to the carrier over a cellular telephone communications link. This communication may be low-bandwidth, may occur when first user equipment 12 is connected to a network that does not have IP connectivity to carrier ePDG 24 such as a corporate network that does not have Internet, or may be high speed without communicating using IP (e.g., a high speed network that does not have SIM-based devices that need to send SMS messages, a private IP corporate network without Internet connectivity, etc.). In other words, low-bandwidth communications link 50 need not be low-bandwidth and may, in general, be any communications link that does not fit the criteria of being able to connect to a network that has high speed IP connectivity to carrier ePDG 24.

Figure 2:
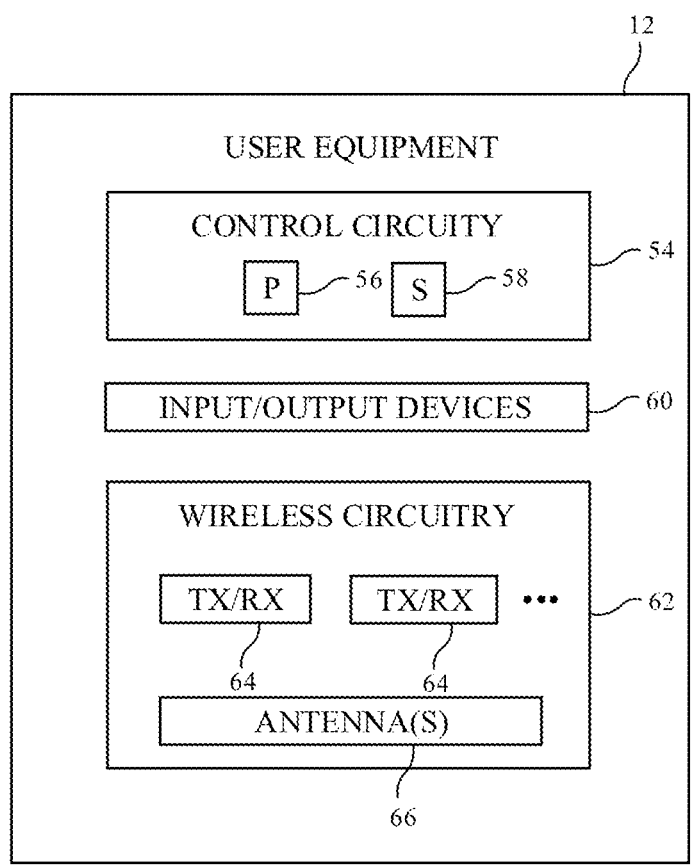
FIG. 2 is a schematic diagram of illustrative user equipment for conveying SMS message data over a communications network in accordance with some embodiments.

FIG. 2 is a schematic diagram of first user equipment 12. First user equipment 12 may be a portable electronic device such as a cellular telephone, portable media player, wearable electronic device (e.g., wristwatch), laptop computer, tablet computer, gaming controller, remote control, or electronic navigation device, other larger electronic devices such as a desktop computer, television, set-top box, home entertainment system, server, or computer monitor, or may include electronic equipment integrated into a larger system such as a kiosk, building, or vehicle. First user equipment 12 may include a housing having housing walls formed from dielectric and/or conductive materials. Second user equipment 14 of FIG. 1 may include any of these types of equipment. In another suitable arrangement, second user equipment 14 may include Internet service equipment. Information conveyed between first user equipment 12 and second user equipment 14 may include any desired information (e.g., message data, application data, image data, video data, email data, webpage data, authentication data such as two-factor authentication codes, real-time chat data, etc.).

As shown in FIG. 2, first user equipment 12 may include control circuitry 54, input/output devices 60, and wireless circuitry 62. Control circuitry 54 may include storage such as storage 58. Storage 58 may include volatile memory (e.g., static or dynamic random-access-memory), nonvolatile memory (e.g., flash memory or other electrically-programmable-read-only memory), hard drive storage, etc. Control circuitry 54 may also include processing circuitry 56. Processing circuitry 56 may control the operation of first user equipment 12. Processing circuitry 56 may include one or more application specific integrated circuits, microprocessors, microcontrollers, baseband processor integrated circuits, central processing units, digital signal processors, etc.

Control circuitry 54 may be used to run software on first user equipment 12 such as operating system functions, software applications, etc. For example, storage 58 may store computer code or other software instructions that are executed by processing circuitry 56. The computer code may be stored on a non-transitory computer readable storage medium (e.g., storage 58 or a removable storage medium). Control circuitry 54 may also be used in implementing wireless communications protocols (e.g., wireless communications protocols associated with different radio-access technologies that are used to wirelessly convey data over wireless communications links in high-bandwidth communications links 34 and 36 and low-bandwidth communications link 50 of FIG. 1).

Input/output devices 60 are used in providing input to and output from first user equipment 12. For example, input/output devices 60 may include one or more displays (e.g., touch sensitive displays, liquid crystal displays, light emitting diode displays, etc.), sensors (e.g., light sensors, proximity sensors, range sensors, image sensors, audio sensors such as microphones, force sensors, moisture sensors, humidity sensors, fingerprint sensors, pressure sensors, touch sensors, ultrasonic sensors, accelerometers, gyroscopes, compasses, etc.), status indicator lights, speakers, vibrators, keyboards, touch pads, buttons, joysticks, etc.

Wireless circuitry 62 may include radio-frequency transceivers 64 and one or more antennas 66 for wirelessly communicating with external equipment (e.g., cellular base station 22, wireless access point 20, and proxy server 30 of FIG. 1). Antennas 66 may include any desired types of antennas such as patch antennas, dipole antennas, monopole antennas, inverted-F antennas, planar inverted-F antennas, slot antennas, helical antennas, combinations of these and/or other types of antennas, etc. Transceivers 64 may be used to transmit and receive radio-frequency signals using antennas 66. Transceivers 64 may each be formed from respective integrated circuits or may share one or more integrated circuits. Transceivers 64 may include mixer circuitry, analog-to-digital converter circuitry, digital-to-analog transceiver circuitry, amplifier circuitry, and/or any other desired components for transmitting and receiving radio-frequency signals. Wireless circuitry 62 may also include baseband processor circuitry, transmission line structures, filter circuitry, switching circuitry, and/or any other desired circuitry for transmitting and receiving wireless radio-frequency signals using antennas 66.

If desired, each transceiver 64 may handle radio-frequency signals using a different respective radio access technology and/or frequency band. For example, a first transceiver 64 may handle communications over high-bandwidth communications link 36 of FIG. 1 using a first radio access technology and/or a first frequency band, a second transceiver 64 may handle communications over high-bandwidth communications link 34 using a second radio access technology and/or a second frequency band, and a third transceiver 64 may handle communications over low-bandwidth communications link 50 using a third radio access technology and/or a third frequency band. This is merely illustrative and, if desired, the same radio access technology and/or frequency band may be used to handle one, two, or each of low-bandwidth communications link 50, high-bandwidth communications link 34, and high-bandwidth communications link 36. Similar components may be used to form second user equipment 14 of FIG. 1 if desired.

Figure 3:
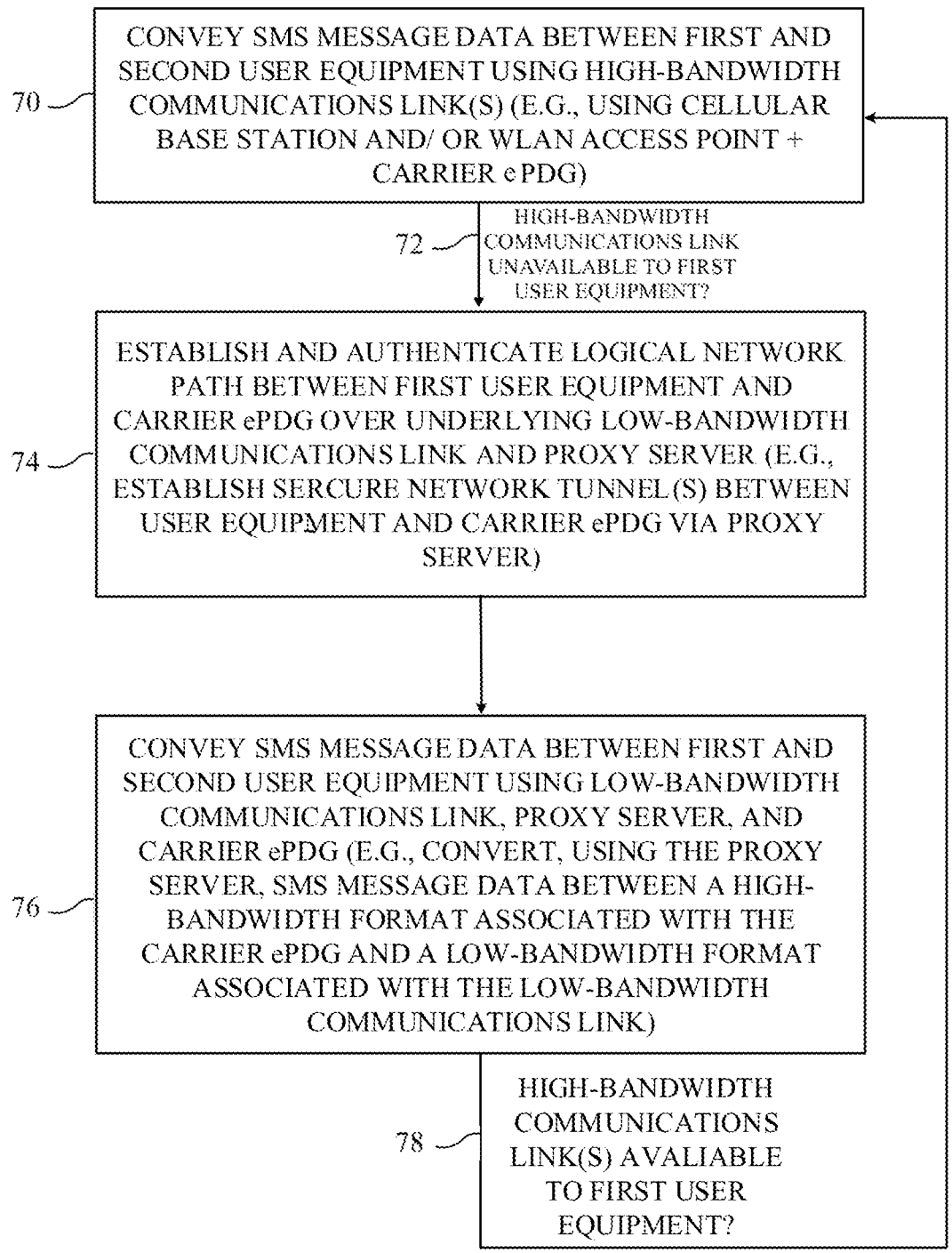
FIG. 3 is a flow chart of illustrative steps involved in using a communications network to convey SMS message data via a low-bandwidth communications link and a proxy server when high-bandwidth communications links are unavailable in accordance with some embodiments.

FIG. 3 is a flow chart of illustrative steps that may be performed by communications network 10 of FIG. 1 to convey SMS message data between first user equipment 12 and second user equipment 14. The steps of FIG. 3 may, for example, allow for seamless or near-seamless communications between second user equipment 14 and first user equipment 12 using SMS message data even after high-bandwidth communications links 36 and 34 have become unavailable to first user equipment 12.

At step 70 of FIG. 3, communications network 10 may convey SMS message data between first user equipment 12 and second user equipment 14 using high-bandwidth communications links 36 and/or 34. For example, SMS messages may be conveyed between carrier core network 16 and first user equipment 12 via data path 38 and high-bandwidth communications link 36. As another example, SMS-over-IP SIP messages may be conveyed between first user equipment 12 and carrier ePDG 24 via data path 40, wireless access point 20, and high-bandwidth communications link 34 (e.g., over an IPSec tunnel from carrier ePDG 24 to first user equipment 12 through wireless access point 20). SMS message data received at first user equipment 12 may be provided to software applications running on first user equipment 12 (e.g., for displaying to a user using a display on the first user equipment). SMS message data transmitted by first user equipment 12 may be provided by software applications running on user equipment 12 and/or one or more user input devices on the first user equipment.

When high-bandwidth communications links 36 and 34 are no longer available to first user equipment 12, processing may proceed to step 74 as shown by arrow 72. High-bandwidth communications links 36 and 34 may become unavailable when first user equipment 12 has moved out of range of wireless access point 20 and cellular base station 22 (e.g., when first user equipment 12 has moved out of range of any wireless access points or cellular base stations), when first user equipment 12 no longer has access to cellular base station 22 and wireless access point 20 (e.g., because cellular base station 22 and wireless access point 20 are operated by a network carrier that does not provide first user equipment 12 with access to cellular base station 22 and wireless access point 20), when cellular base station 22 and wireless access point 20 are disabled, inoperable, or powered down, etc.

If desired, first user equipment 12 may monitor the status of high-bandwidth communications links 34 and 36 and may identify when high-bandwidth communications links 34 and 36 have become unavailable. For example, first user equipment 12 may monitor the link quality of high-bandwidth communications links 34 and 36 (e.g., using received signal strength measurements, received signal strength indicator measurements, error rate measurements, signal-to-noise ratio measurements, etc.), may determine when data is no longer being received over high-bandwidth communications links 36 and 34, may process satellite navigation data or other sensor data to identify when first user equipment 12 is no longer in range of cellular base station 22 and wireless access point 20, may identify messages received from cellular base station 22, wireless access point 20, or elsewhere indicating that high-bandwidth communications links 34 and 36 are no longer available, and/or may perform any other desired operations to determine when high-bandwidth communications links 34 and 36 have become unavailable. Cellular base station 22, wireless access point 20, and/or any other desired components in communications network 10 may perform one or more of these operations to determine when high-bandwidth links 34 and 36 have become unavailable if desired.

At step 74 (e.g., in response to identifying, at first user equipment 12, that high-bandwidth communications links 36 and 34 are unavailable), communications network 10 may establish and authenticate a logical network path between first user equipment 12 and carrier ePDG 24 through low-bandwidth communications link 50, proxy server 30, and data path 52. The example of FIG. 3 is merely illustrative and, in another suitable arrangement, step 74 may be performed while one or more of the high-bandwidth communications links are still being used to convey SMS message data (e.g., step 74 may be performed concurrently with step 70).

In establishing and authenticating the logical network path, communications network 10 may establish one or more secure network tunnels between carrier ePDG 24 and first user equipment 12. For example, first user equipment 12 and proxy server 30 may establish a first secure network tunnel such as an interworking wireless local area network (iWLAN) tunnel between first user equipment 12 and proxy server 30. SMS message data may be conveyed over the first network tunnel by encapsulating the SMS message data using a compression algorithm or envelope associated with low-bandwidth communications link 50 prior to conveying the SMS message data over the low-bandwidth communications link. This encapsulation may be reversed using a decompression (de-encapsulation) algorithm after the SMS message data has been conveyed over the low-bandwidth communications link and the first secure network tunnel (e.g., at proxy server 30 or first user equipment 12). First user equipment 12 and proxy server 30 may convey data over communications link 50 without using a network tunnel if desired. Communications network 10 may also establish a second secure network tunnel (e.g., an IPSec tunnel) between proxy server 30 and carrier ePDG 24. The established and authenticated logical network path may include the underlying low-bandwidth communications link 50, proxy server 30, and data path 52. However, proxy server 30 may appear indistinguishable from first user equipment 12 to carrier ePDG 24 (e.g., proxy server 30 may serve as a proxy for first user equipment 12 from the perspective of carrier ePDG 24).

At step 76, communications network 10 may convey SMS message data between first user equipment 12 and second user equipment 14 using low-bandwidth communications link 50, proxy server 30, data path 52, and carrier ePDG 24. For example, first user equipment 12 may transmit SMS message data in a low-bandwidth format (e.g., as a compressed message) to proxy server 30 over low-bandwidth communications link 50. Proxy server 30 may convert the SMS message data from the low-bandwidth format into a high-bandwidth format associated with carrier ePDG 24 (e.g., proxy server 30 may convert the compressed message into an SMS-over-IP SIP message). Proxy server 30 may transmit the SMS message data in the high-bandwidth format (e.g., as an SMS-over-IP SIP message) to carrier ePDG 24 over data path 52 (e.g., via the IPSec tunnel between proxy server 30 and carrier ePDG 24). Carrier ePDG 24 may transmit the SMS message data to second user equipment 14 via carrier core network 16, SMS controller 18, and network portion 32. This process may be reversed to receive SMS message data from second user equipment 14 at first user equipment 12.

Carrier ePDG 24 may be unable to distinguish between the IPSec tunnel between carrier ePDG 24 and proxy server 30 and an IPSec tunnel between carrier ePDG 24 and first user equipment 12 through wireless access point 20 (e.g., as used to convey SMS-over-IP SIP messages while processing step 70). Similarly, carrier ePDG 24 may be unable to distinguish between the SMS-over-IP SIP messages received from wireless access point 20 and the SMS-over-IP SIP messages received from proxy server 30 (e.g., because the SMS-over-IP SIP messages received at carrier ePDG 24 are the same regardless of whether the messages were conveyed over data path 40 and high-bandwidth communications link 34 or whether the messages were conveyed over data path 52 and low-bandwidth communications link 50 via proxy server 30). Proxy server 30 may therefore appear to carrier ePDG 24 and the rest of communications network 10 above dashed line 41 of FIG. 1 as indistinguishable from first user equipment 12. SMS message data conveyed to first user equipment 12 from second user equipment 14 may terminate at proxy server 30 (e.g., as if proxy server 30 were in fact the first user equipment 12). Proxy server 30 may then forward the SMS message data to first user equipment 12 (e.g., as a compressed message) over low-bandwidth communications link 50.

In this way, first user equipment 12 and second user equipment 14 may continue to convey SMS message data even when high-bandwidth communications links 34 and 36 are unavailable. Once high-bandwidth communications link 34 and/or high-bandwidth communications link 36 have become available again, processing may loop back to step 70, as shown by arrow 78. Communications network 10 may then continue conveying SMS message data using high-bandwidth communications links 34 and 36 until the high-bandwidth communications links are no longer available.

Figure 4:
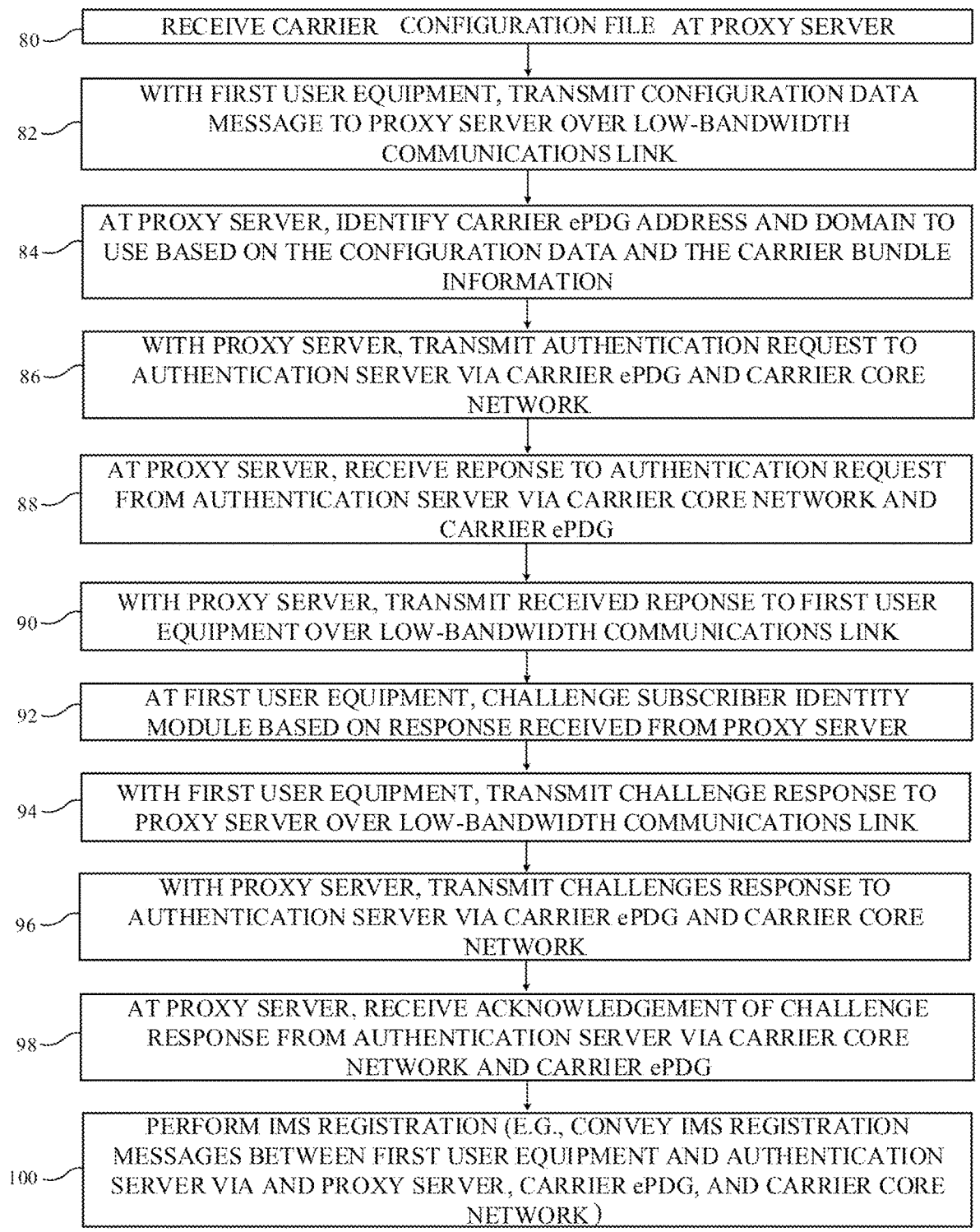
FIG. 4 is a flow chart of illustrative steps involved in establishing and authenticating a logical network path between user equipment and a carrier Evolved Packet Data Gateway (ePDG) via a low-bandwidth communications link and a proxy server in accordance with some embodiments.

FIG. 4 is a flow chart of illustrative steps that may be performed by communications network 10 in establishing and authenticating a logical network path between first user equipment 12 and carrier ePDG 24 through an underlying low-bandwidth communications link 50, proxy server 30, and data path 52 (FIG. 1). Some or all of the steps of FIG. 4 may, for example, be performed while processing step 74 of FIG. 3.

At step 80 of FIG. 4, proxy server 30 may receive carrier configuration file information (e.g., one or more carrier configuration files) from carrier configuration file server 28 over data path 48. Carrier configuration file server 28 may store the latest carrier configuration file for each network carrier associated with communication network 10. The carrier configuration file information may identify the domain and network address of one or more carrier ePDGs such as carrier ePDG 24. Carrier configuration file server 28 may periodically update the carrier configuration file information over time. Step 80 may be performed concurrently with or prior to step 70 of FIG. 3, if desired.

At step 82 of FIG. 4, first user equipment 12 may transmit a configuration data message to proxy server 30 over low-bandwidth communications link 50. The configuration data message may include the international mobile subscriber identity (IMSI) of first user equipment 12 or other network identity information that uniquely identifies first user equipment 12. The configuration data may also include the network access identifier (NAI) of first user equipment 12, which identifies the network carrier associated with first user equipment 12. As an example, the NAI may be of the form "x<IMSI>@nai.epc.mnc<MNC>.mcc<MCC>.3gppnetwork.org,", "imsi@realm," or other formats, where "x" represents a version of Extensible Authentication Protocol Authentication and Key Agreement (EAP-AKA) that is used (e.g., "0<IMSI>@nai.epc.mnc<MNC>.mcc<MCC>. 3gppnetwork.org" to signal regular EAP-AKA, "6<IMSI>@nai.epc.mnc<MNC>.mcc<MCC>.3gppnetwork.org" to signal EAP-AKA', "0<IMSI>@nai.epc.mnc<MNC>.mcc<MCC>. 3gppnetwork.org" to signal EAP-SIM, etc.). If desired, the configuration data message may include any other desired information (e.g., information identifying the configuration data message as a configuration data message to use in establishing a logical path between first user equipment 12 and carrier ePDG 24, the domain and network address of carrier ePDG 24, etc.).

Proxy server 30 may subsequently begin a network authentication procedure such as an Internet Key Exchange Version 2 (IKEv2) procedure based on the configuration data message and the carrier configuration file information. For example, at step 84, proxy server 30 may identify the domain and network address of carrier ePDG 24 based on the configuration data received from first user equipment 12 and the carrier configuration file information received from carrier configuration file server 28. Proxy server 30 may, for example, identify the carrier ePDG domain and network address in the carrier configuration file server information corresponding to the NAI in the configuration data received from first user equipment 12.

As part of the network authentication procedure, proxy server 30 may begin a key exchange procedure such as an Extensible Authentication Protocol Authentication and Key Agreement (EAP-AKA) key exchange with authentication server 26. For example, at step 86, proxy server 30 may transmit an authentication request to carrier ePDG 24 (e.g., using the domain and network address identified while processing step 84). Carrier ePDG 24 may pass the authentication request to authentication server 26 via data path 42, carrier core network 16, and data path 46. Authentication server 26 may generate a response to the authentication request and may transmit the response to proxy server 30.

At step 88, proxy server 30 may receive the response to the authentication request from authentication server 26 via data path 46, carrier core network 16, data path 42, carrier ePDG 24, and data path 52.

At step 90, proxy server 30 may transmit the response to the authentication request to first user equipment 12 over low-bandwidth communications link 50.

At step 92, first user equipment 12 may challenge a subscriber identity module (SIM) at first user equipment 12 using the response to the authentication request received over low-bandwidth communications link 50. When challenged by the response to the authentication request, the SIM at first user equipment 12 may produce a challenge response.

At step 94, first user equipment 12 may transmit the challenge response to proxy server 30 over low-bandwidth communications link 50.

At step 96, proxy server 30 may transmit the challenge response to authentication server 26 via data path 52, carrier ePDG 24, data path 42, carrier core network 16, and data path 46. The challenge response may appear to authentication server 26 and the rest of communications network 10 above dashed line 41 of FIG. 1 as if it were generated by a SIM at proxy server 30 (e.g., because proxy server 30 serves as a proxy for first user equipment 12). Authentication server 26 may verify the received challenge response and, once the challenge response has been verified, may transmit an acknowledgement of the challenge response to proxy server 30.

At step 98, proxy server 30 may receive the acknowledgement of the challenge response from authentication server 26 via data path 46, carrier core network 16, data path 42, carrier ePDG 24, and data path 52. Once proxy server 30 has received the acknowledgment, a secure and authentic network tunnel such as an IPSec tunnel is established between proxy server 30 and carrier ePDG 24.

At step 100, communications network 10 may perform IMS registration operations for proxy server 30. For example, proxy server 30 may provide an IMS registration request to authentication server 26 (e.g., via the IPSec tunnel over data path 52, carrier ePDG 24, data path 42, carrier core network 16, and data path 46). Authentication server 26 may respond to the IMS registration request with unique response data transmitted to proxy server 30. Proxy server 30 may convey the unique response data to first user equipment 12 over low-bandwidth communications link 50. First user equipment 12 may use the unique response data to challenge the SIM at first user equipment 12, which generates a challenge response. First user equipment 12 may transmit the challenge response to proxy server 30 over low-bandwidth communications link 50. Proxy server 30 may transmit the challenge response to authentication server 26 (e.g., via the IPSec tunnel over data path 52, carrier ePDG 24, data path 42, carrier core network 16, and data path 46). Authentication server 26 may verify the challenge response and, once the challenge response has been verified, may transmit a corresponding acknowledgement to proxy server 30. At this point, proxy server 30 and thus first user equipment 12 may be IMS-registered. Once IMS registration is complete, a secure and authenticated logical network path is established between first user equipment 12 and carrier ePDG 24 through proxy server 30. SMS message data may subsequently be conveyed over low-bandwidth communications link 50 and over data path 52 (e.g., via the IPSec tunnel). This example is merely illustrative and, if desired, other authentication procedures may be used to establish and authenticate the logical network path.

Figure 5:
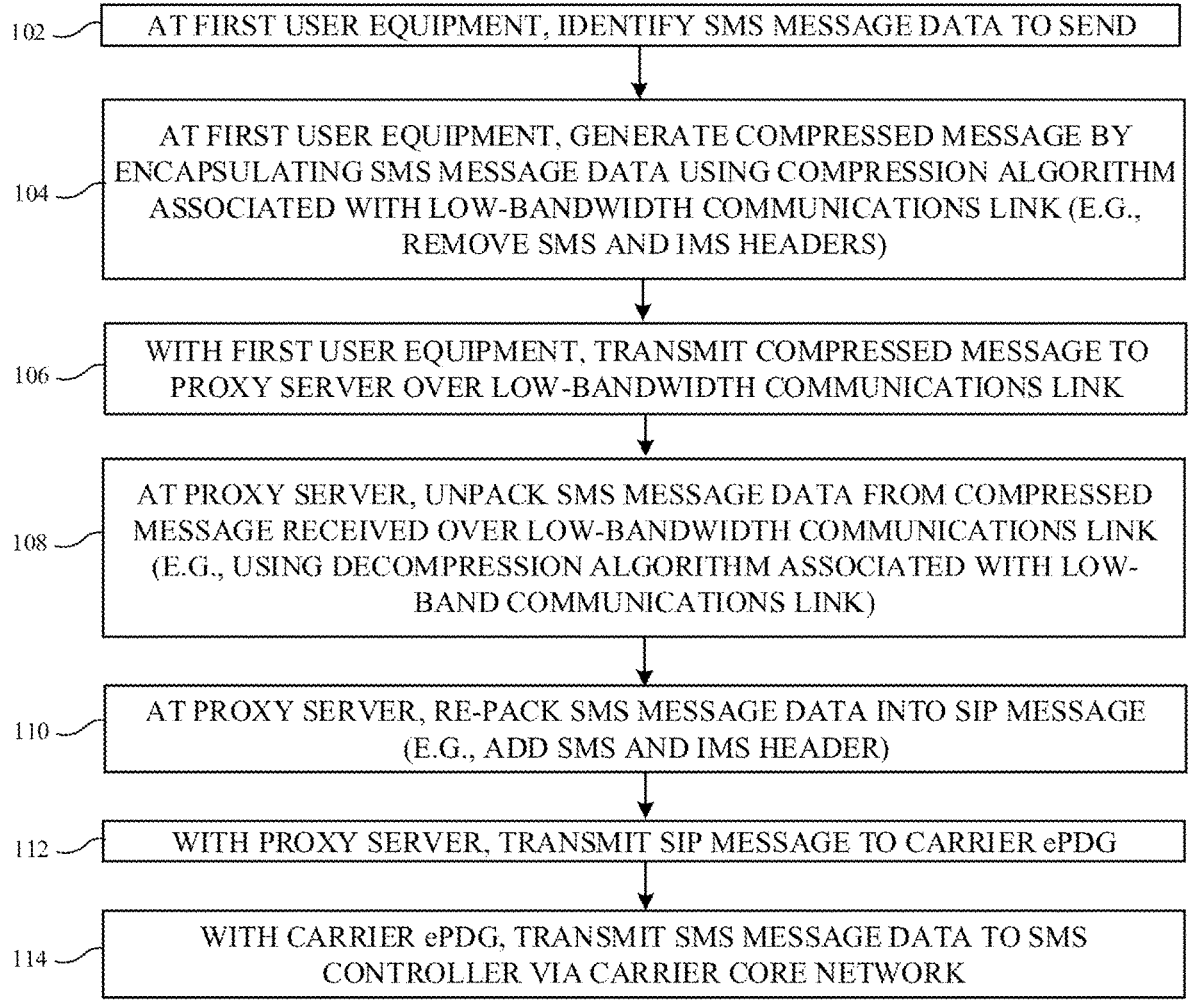
FIG. 5 is a flow chart of illustrative steps involved in transmitting SMS message data from user equipment to a carrier ePDG via a low-bandwidth communications link and a proxy server in accordance with some embodiments.

FIG. 5 is a flow chart of illustrative steps that may be performed by communications network 10 in transmitting SMS message data from first user equipment 12 to second user equipment 14. The steps of FIG. 5 may, for example, be performed while processing step 76 of FIG. 3.

At step 102 of FIG. 5, first user equipment 12 may identify SMS message data to transmit to second user equipment 14. The SMS message data may be a data payload that includes text or other input generated by software applications running on the user equipment or provided by a user via input/output devices on or coupled to the user equipment. In scenarios where high-bandwidth communications link 36 is available, the SMS message data may be included in an SMS message or in an SMS-over-IP SIP message provided to cellular base station 22 over high-bandwidth communications link 36. Similarly, in scenarios where high-bandwidth communications link 34 is available, the SMS message data may be included in an SMS-over-IP SIP message provided to wireless access point 20 over high-bandwidth communications link 34. When high-bandwidth communications links 34 and 36 are unavailable, only low-bandwidth communications link 50 is available for first user equipment 12 to transmit the SMS message data. However, low-bandwidth communications link 50 may be unable to support excessively large messages such as SMS-over-IP messages.

At step 104, first user equipment 12 may generate a compressed message that includes the identified SMS message data (e.g., a compressed message in the low-bandwidth format associated with low-bandwidth communications link 50). To generate the compressed message, first user equipment 12 (e.g., control circuitry 54 of FIG. 2) may encapsulate the SMS message data using a compression algorithm or envelope associated with low-bandwidth communications link 50. The compression algorithm may, for example, remove any SMS or IMS headers from the SMS message data (e.g., headers that would otherwise be present when the SMS message data is sent as an SMS-over-IP SIP message via high-bandwidth communications links 34 or 36) and/or may perform any other desired compression operations on the SMS message data. Removing the SMS and IMS headers from the SMS message data may significantly reduce the size of the compressed message relative to the size of an SMS-over-IP SIP message. The compressed message may, for example, be less than 5 kB, less than 1 kB, etc. This reduced size may allow the compressed message to be conveyed over low-bandwidth communications link 50. The compressed message may include Link Layer headers or other relatively small headers (e.g., headers that are smaller in size than SMS or IMS headers), network identity information associated with first user equipment 12 (e.g., the IMSI of first user equipment 12), and/or any other desired information that helps to route the SMS message data in the compressed message to a desired destination (e.g., to second user equipment 14).

At step 106, first user equipment 106 may transmit the compressed message to proxy server 30 over low-bandwidth communications link 50. The encapsulation of the SMS message data to form the compressed message may, for example, configure the SMS message data to be conveyed over the first secure network tunnel between first user equipment 12 and proxy server 30 (e.g., via the underlying low-bandwidth communications link 50).

At step 108, proxy server 30 may unpack (extract) the SMS message data from the compressed message received over low-bandwidth communications link 50. For example, proxy server 30 may unpack the SMS message data by performing a decompression algorithm (e.g., de-enveloping or de-encapsulating process) on the compressed message (e.g., the decompression algorithm may reverse the compression algorithm performed by first user equipment 12 because the first secure network tunnel terminates at proxy server 30).

At step 110, proxy server 30 may re-pack the unpacked SMS message data into a high-bandwidth format associated with data path 52. For example, proxy server 30 may re-pack (e.g., encapsulate) the SMS message data as an SMS-over-IP SIP message. The SMS-over-IP SIP message may include SMS and IMS headers (e.g., headers that were removed at first user equipment 12 while processing step 104), where the SMS message data forms the data payload for the SMS-over-IP SIP message.

At step 112, proxy server 30 may transmit the SMS-over-IP SIP message to carrier ePDG 24 via data path 52 (e.g., over the IPSec tunnel between proxy server 30 and carrier ePDG 24). The SMS-over-IP SIP message generated by proxy server 30 may be indistinguishable to carrier ePDG 24 from an SMS-over-IP SIP message conveyed to carrier ePDG 24 via wireless access point 20 and high-bandwidth communications link 34. While the source address header fields of the SMS-over-IP SIP message may identify proxy server 30 as the source of the SMS-over-IP SIP message rather than first user equipment 12), carrier ePDG 24 may have no way of knowing that proxy server 30 is a network entity that is different from first user equipment 12 (e.g., proxy server 30 serves as a proxy for first user equipment 12 and, from the perspective of carrier ePDG 24, is indistinguishable from first user equipment 12).

At step 114, carrier ePDG 24 may transmit the SMS message data (e.g., the SMS-over-IP SIP message) received from proxy server 30 to carrier core network 16 over data path 42. Carrier core network 16 may transmit the SMS message data to SMS controller 18 over data path 44. SMS controller 18 may transmit the SMS message data to second user equipment 14 via network portion 32.

Figure 6:
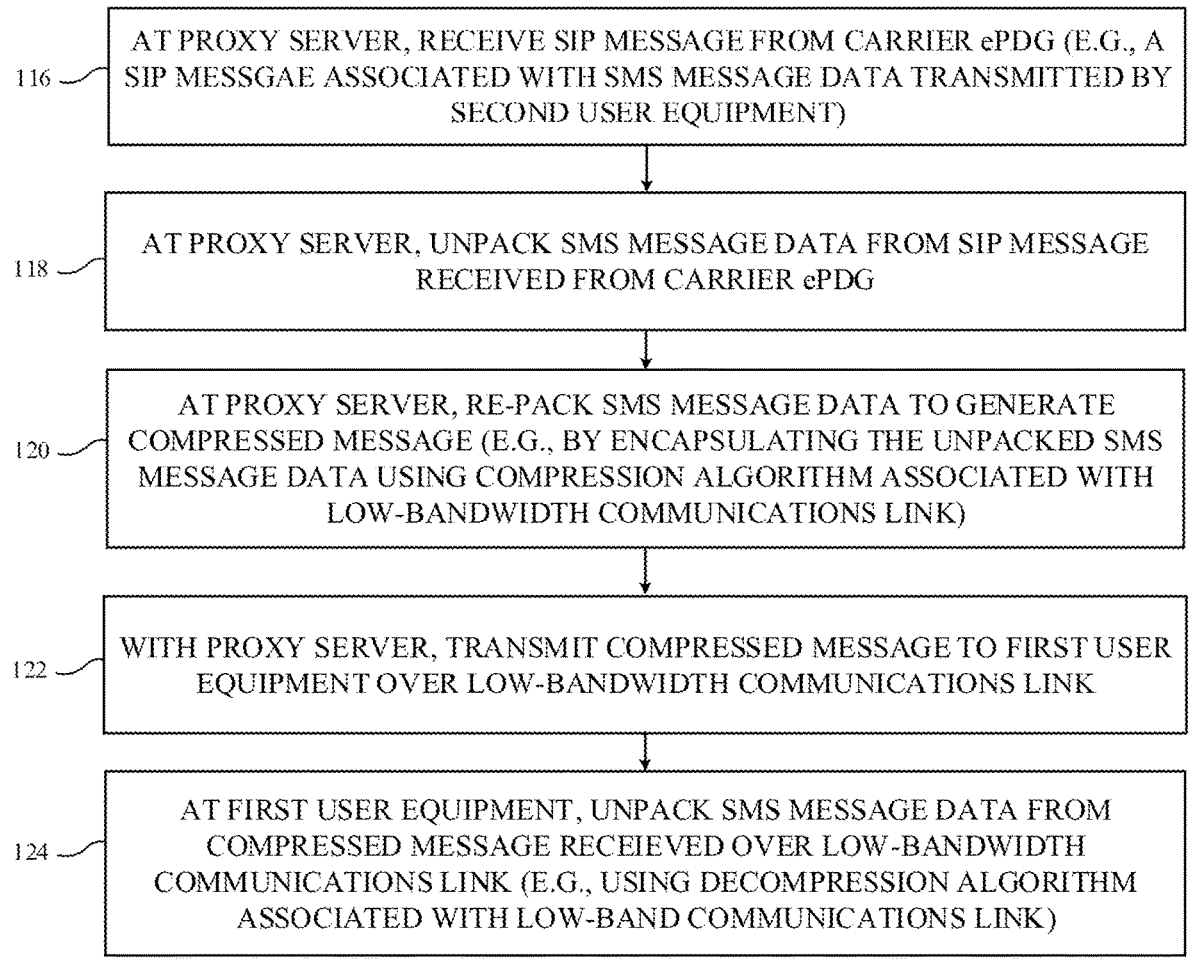
FIG. 6 is a flow chart of illustrative steps involved in receiving SMS message data at user equipment via a proxy server and a low-bandwidth communications link in accordance with some embodiments.

FIG. 6 is a flow chart of illustrative steps that may be performed by communications network 10 in transmitting SMS message data from second user equipment 14 to first user equipment 12. The steps of FIG. 6 may, for example, be performed while processing step 76 of FIG. 3. Second user equipment 14 may transmit SMS message data (e.g., in an SMS message or an SMS-over-IP SIP message) that is forwarded to carrier core network 16 by SMS controller 18. Carrier core network 16 may pass the SMS message data to carrier ePDG 24 over data path 42. Carrier ePDG 24 may transmit an SMS-over-IP SIP message that includes the SMS message data to proxy server 30 over data path 52 (e.g., over the IPSec tunnel associated with data path 52).

At step 116 of FIG. 6, proxy server 30 may receive the SMS-over-IP SIP message from carrier ePDG 24. From the perspective of carrier ePDG 24, proxy server 30 is the destination for the SMS message data in the SMS-over-IP SIP message. However, proxy server 30 is aware of low-bandwidth communications link 50 and that first user equipment 12 is the final destination for the SMS message data in the SMS-over-IP SIP message.

At step 118, proxy server 30 may unpack the SMS message data from the SMS-over-IP SIP message received from carrier ePDG 24.

At step 120, proxy server 30 may re-pack the SMS message data to generate a compressed message. For example, proxy server 30 may generate the compressed message by encapsulating the SMS message data using the compression algorithm or envelope associated with low-bandwidth communications link 50 (e.g., using the same compression algorithm used by first user equipment 12 while processing step 104 of FIG. 5).

At step 122, proxy server 30 may transmit the compressed message to first user equipment 12 over low-bandwidth communications link 50.

At step 124, first user equipment 12 may unpack the SMS message data from the compressed message received from proxy server 30 over low-bandwidth communications link 50. For example, first user equipment 12 may unpack the SMS message data by performing the decompression algorithm (e.g., de-enveloping or de-encapsulating process) associated with low-bandwidth communications link 50 on the compressed message (e.g., the same decompression algorithm used by proxy server 30 in processing step 108 of FIG. 5). The unpacked SMS message data may be provided to software applications running on first user equipment 12 (e.g., for display to a user of first user equipment 12).

The steps of FIGS. 5 and 6 may be processed to exchange SMS messages in both directions between first user equipment 12 and second user equipment 14 when high-bandwidth communications links 34 and 36 are unavailable. In another suitable arrangement, second user equipment 14 may broadcast SMS message data to first user equipment 12 and/or other user equipment in communications network 10 (e.g., without first user equipment 12 transmitting SMS message data back to second user equipment 14). Rather than being addressed to an individual proxy server 30, SMS-over-IP SIP messages that include SMS message data broadcasted by second user equipment 14 may be provided to multiple user equipment network addresses by carrier ePDG 24 (e.g., different network addresses known by the network carrier associated with carrier core network 16 and carrier ePDG 24 to be located within or associated with a particular geographic region or area). In scenarios where high-bandwidth communications links 34 and 36 are unavailable, this broadcasted SMS message data (e.g., the SMS-over-IP SIP messages that include the broadcasted SMS message data) may be addressed to proxy server 30 (e.g., because proxy server 30 represents first user equipment 12 from the perspective of carrier ePDG 24). Proxy server 30 may forward the broadcasted SMS message data to first user equipment 12 over low-bandwidth communications link 50.

Figure 7:
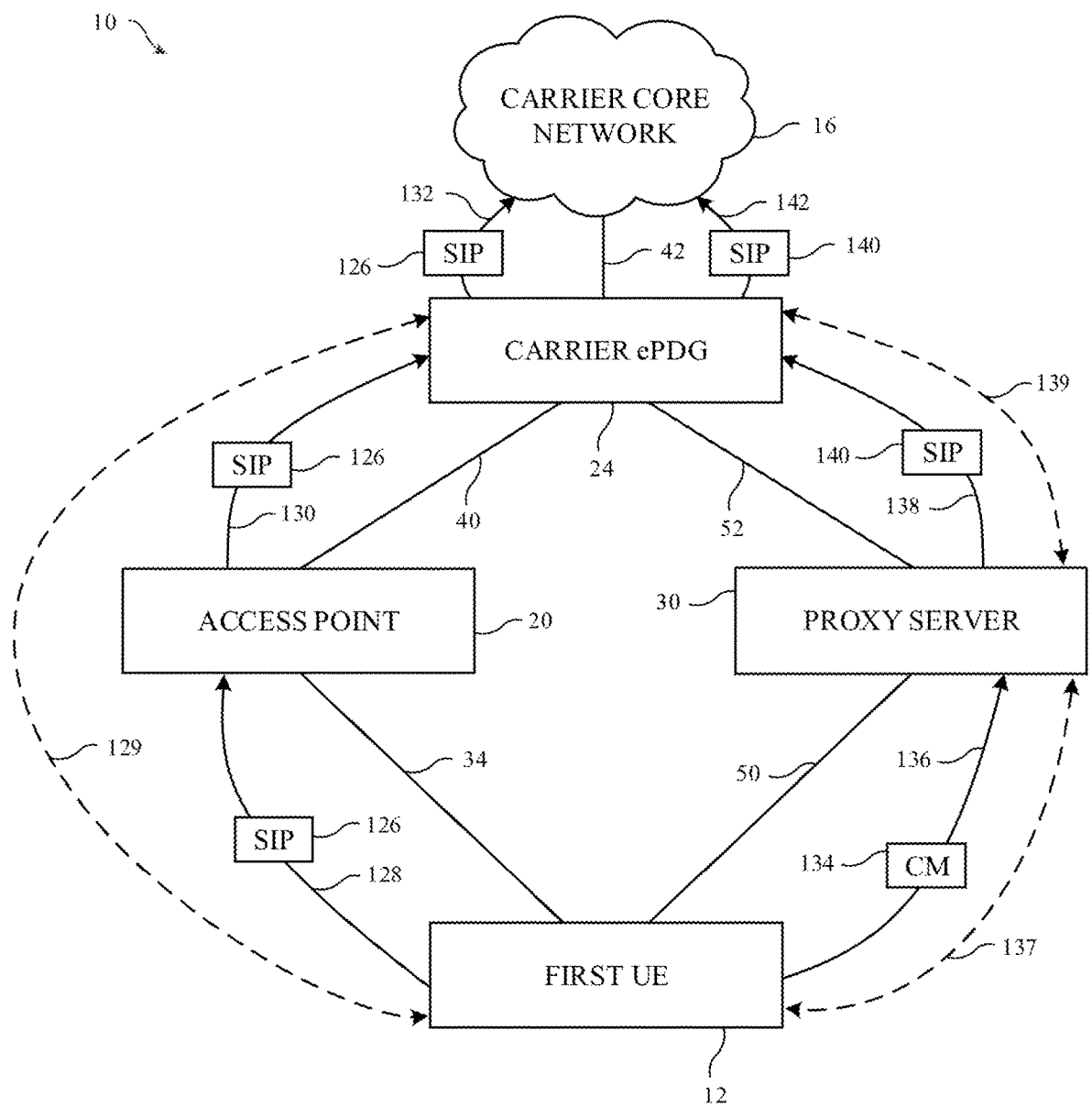
FIG. 7 is flow diagram showing how illustrative user equipment may transmit SMS message data over a high-bandwidth communications link and then over a low-bandwidth communications when the high-bandwidth communications link is unavailable in accordance with some embodiments.

FIG. 7 is a flow diagram showing how first user equipment 12 may transmit SMS message data over communications network 10 when high-bandwidth communications link 34 is available and when high-bandwidth communications link 34 is unavailable. As shown in FIG. 7, when high-bandwidth communications link 34 is available, first user equipment 12 may transmit SMS-over-IP SIP message 126 to wireless access point 20 over high-bandwidth communications link 34, as shown by arrow 128. Wireless access point 20 may route SMS-over-IP SIP message 126 to carrier ePDG 24 over data path 40, as shown by arrow 130. Communications network 10 may, for example, transmit SMS-over-IP SIP message 126 over a secure network tunnel such as IPSec tunnel 129 that extends from first user equipment 12 to carrier ePDG 24 through wireless access point 20 (e.g., an IPSec tunnel that runs through wireless access point 20 but that terminates at first user equipment 12 and carrier ePDG 24). Carrier ePDG 24 may transmit SMS-over-IP SIP message 126 to carrier core network 16 over data path 42, as shown by arrow 132. Carrier ePDG 24 may transmit the SMS message data from SMS-over-IP SIP message 126 to carrier core network 16 in other formats if desired. The communications network may subsequently transmit the SMS message data to the second user equipment via SMS controller 18 of FIG. 1.

When high-bandwidth communications link 34 is unavailable, first user equipment 12 may generate compressed message (CM) 134 by encapsulating (compressing) the SMS message data that would otherwise have been transmitted in SMS-over-IP SIP message 126 (e.g., while processing step 104 of FIG. 5). First user equipment 12 may transmit compressed message 134 to proxy server 30 over low-bandwidth communications link 50, as shown by arrow 136 (e.g., while processing step 106 of FIG. 5). Compressed message 134 may, for example, be transmitted over a secure network tunnel 137 extending from first user equipment 12 to proxy server 30. While low-bandwidth communications link 50 may not have sufficient bandwidth to support transmission of SMS-over-IP SIP messages, low-bandwidth communications link 50 may be capable of transmitting compressed message 134, which is much smaller than SMS-over-IP SIP message 126.

Proxy server 30 may unpack the SMS message data from compressed message 134 and may re-pack (encapsulate) the SMS message data as SMS-over-IP SIP message 140 (e.g., while processing steps 108 and 110 of FIG. 5). Proxy server 30 may transmit SMS-over-IP SIP message 140 to carrier ePDG 24 over data path 52, as shown by arrow 138 (e.g., while processing step 112 of FIG. 5). SMS-over-IP SIP message 140 may, for example, be transmitted over a secure network tunnel such as IPSec tunnel 139 extending from proxy server 30 to carrier ePDG 24 (e.g., an IPSec tunnel that terminates at proxy server 30 and carrier ePDG 24). SMS-over-IP SIP message 140 may be indistinguishable from SMS-over-IP SIP message 126 to carrier ePDG 24 (e.g., carrier ePDG 24 may be unable to distinguish between IPSec tunnel 129 and IPSec tunnel 139). Carrier ePDG 24 may transmit SMS-over-IP SIP message 140 to carrier core network 16 over data path 42, as shown by arrow 142. Carrier ePDG 24 may transmit the SMS message data from SMS-over-IP SIP message 140 to carrier core network 16 in other formats if desired. The communications network may subsequently transmit the SMS message data to the second user equipment via SMS controller 18 of FIG. 1.

Figure 8:
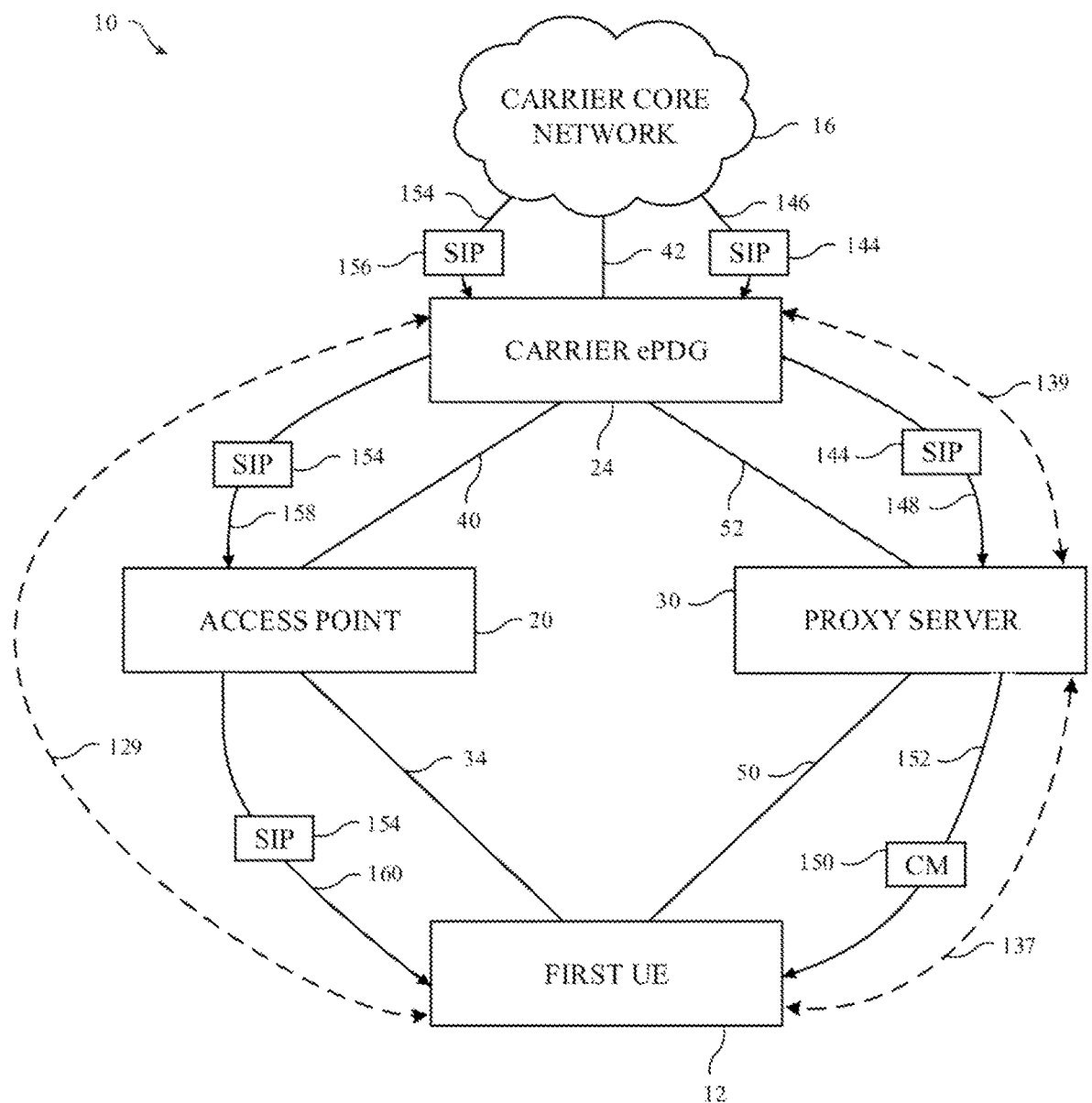
FIG. 8 is flow diagram showing how illustrative user equipment may receive SMS message data over a high-bandwidth communications link and then over a low-bandwidth communications link when the high-bandwidth communications link is unavailable in accordance with some embodiments.

FIG. 8 is a flow diagram showing how first user equipment 12 may receive SMS message data over communications network 10 when high-bandwidth communications link 34 is available and when high-bandwidth communications link 34 is unavailable. As shown in FIG. 8, when high-bandwidth communications link 34 is available, carrier ePDG 24 may receive SMS-over-IP SIP message 154 from carrier core network 16 over data path 42, as shown by arrow 156. Carrier ePDG 24 may transmit SMS-over-IP SIP message 154 to first user equipment 12 over IPSec tunnel 129 (e.g., SMS-over-IP SIP message 154 may be conveyed to wireless access point 20 over data path 40, as shown by arrow 158, and may be conveyed to first user equipment 12 over high-bandwidth communications link 34, as shown by arrow 160).

When high-bandwidth communications link 34 is unavailable, carrier ePDG 24 may receive SMS-over-IP SIP message 144 from carrier core network 16 over data path 42, as shown by arrow 146. Carrier ePDG 24 may transmit SMS-over-IP SIP message 144 to proxy server 30 over data path 52, as shown by arrow 148 (e.g., over IPSec tunnel 139). Because carrier ePDG 24 is unable to distinguish between IPSec tunnel 129 and IPSec tunnel 139, SMS-over-IP SIP message 144 may be transmitted to proxy server 30 even though high-bandwidth communications link 34 is unavailable.

Proxy server 30 may unpack the SMS message data from SMS-over-IP SIP message 144 and may re-pack (encapsulate) the SMS message data to generate compressed message 150 (e.g., while processing steps 118 and 120 of FIG. 6). Proxy server 30 may transmit compressed message 150 to first user equipment 12 over low-bandwidth communications link 50, as shown by arrow 152 (e.g., while processing step 122 of FIG. 6). First user equipment 12 may subsequently unpack (de-encapsulate) compressed message 150 to retrieve the SMS message data from SMS-over-IP SIP message 144 (e.g., while processing step 124 of FIG. 6). While low-bandwidth communications link 50 may have insufficient bandwidth to support transmission of SMS-over-IP SIP messages, low-bandwidth communications link 50 may be capable of transmitting compressed message 150, which is much smaller than SMS-over-IP SIP message 154. In this way, first user equipment 12 may continue to transmit and receive SMS message data even when high-bandwidth communications links become unavailable. Because carrier ePDG 24 is unable to distinguish between SMS-over-IP messages from proxy server 30 and SMS-over-IP messages from first user equipment 12, communications may transition from the high-bandwidth communications links to the low-bandwidth communications links without requiring expensive and time-consuming modifications to carrier ePDG 24, carrier core network 16, or other portions of communications network 10.

In practice, first user equipment 12 may rapidly and unpredictably switch between the high-speed communications link (e.g., high-bandwidth communications link 34) and the low-speed communications link (e.g., low-bandwidth communications link 34) such that the same message is received multiple times over different protocols and/or communications links (e.g., over links 34 and 50), potentially over long periods of time. This may occur, for example, in scenarios where both the high-speed communications link (e.g., high-bandwidth communications link 34) and the low-speed communications link (e.g., low-bandwidth communications link 50) are concurrently available and/or in scenarios where proxy server 30 and/or carrier ePDG 24 queue messages for first user equipment 12 such as when first user equipment 12 has no connectivity. Consider an example in which first user equipment 12 receives a message over low-bandwidth communications link 50 but the link is severed before first user equipment 12 sends an acknowledgement (ACK) message back to proxy server 30. Then, when high-bandwidth communications link 34 is back in service (e.g., hours later), first user equipment 12 may receive the same message over link 34 and may send an ACK message to carrier ePDG 24 in response. In these scenarios, first user equipment 12 may perform de-duplication operations to handle the receipt and acknowledgement of these duplicate messages at first user equipment 12.

If desired, proxy server 30 may control other devices to send and receive SMS messages (e.g., SMS-over-IP messages) on behalf of first user equipment 12. For example, proxy server 30 may communicate with one or more additional devices (e.g., a tablet computer, laptop computer, speaker device, desktop computer, cellular telephone, etc.) to control the device(s) to send and/or receive SMS messages on behalf of first user equipment 12 while first user equipment 12 is communicatively coupled to proxy server 30 (e.g., via low-bandwidth communications link 50 or any Internet link). Proxy server 30 may be communicatively coupled to the additional device(s) via any desired wired and/or wireless links. Proxy server 30 may transmit message data from first user equipment 12 to the additional device(s) for transmission to second user equipment 14 and may relay message data received by the additional device(s) to first user equipment 12. This operation may be performed even when first user equipment 12 is not constantly connected to proxy server 30 (e.g., authentication may be performed once and then on some regular period thereafter).

The methods and operations described above in connection with FIGS. 1-8 may be performed by the components of communications network 10 using software, firmware, and/or hardware (e.g., dedicated circuitry or hardware). Software code for performing these operations may be stored on non-transitory computer readable storage media (e.g., tangible computer readable storage media) stored on one or more of the components of communications network 10 or elsewhere (e.g., storage 58 of FIG. 2). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of communications network 10 (e.g., processing circuitry 56 of FIG. 2). The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. A user equipment device comprising:
   wireless circuitry configured to communicate with external equipment over a first communications link having a first bandwidth and over a second communications link having a second bandwidth that is less than the first bandwidth; and
   control circuitry coupled to the wireless circuitry for controlling transmission of message data, wherein the control circuitry is configured to:
      control, while the first communications link is available, the wireless circuitry to transmit the message data in a Session Initiation Protocol (SIP) message over the first communications link, and
      control, while the first communications link is unavailable, the wireless circuitry to transmit the message data in a compressed message over the second communications link.

2. The user equipment device of claim 1, wherein the control circuitry is configured to generate the compressed message by encapsulating, using a compression algorithm associated with the second communications link, the message data.

3. The user equipment device of claim 2, wherein the compressed message does not include a Short Message Service (SMS) header or an IP Multimedia Subsystem (IMS) header.

4. The user equipment device of claim 3, wherein the SIP message comprises an SMS header and an IMS header and wherein the compressed message comprises a link layer header.

5. The user equipment device of claim 1, wherein the message data comprises Short Message (SMS) message data.

6. The user equipment device of claim 1, wherein the first communications link forms part of an overlying network tunnel that runs through a wireless access point and that terminates at the electronic device and at an Evolved Packet Data Gateway (ePDG), the control circuitry being configured to transmit the SIP message to the ePDG through the network tunnel.

7. The user equipment device of claim 6, wherein the control circuitry is configured to transmit the compressed message to a proxy server through an additional network tunnel overlying the second communications link and wherein the additional network tunnel terminates at the electronic device and the proxy server.

8. The user equipment device of claim 1, wherein the control circuitry is configured to identify when the first communications link has become unavailable and wherein the control circuitry is configured to control the wireless circuitry to transmit, in response to identifying that the first communications link has become unavailable, configuration data to a proxy server over the second communications link, wherein the configuration data includes an international mobile subscriber identity associated with the electronic device and a network access identifier associated with the electronic device.

9. The user equipment device of claim 1, wherein the first communications link comprises a first wireless communications link in a first frequency band and wherein the second communications link comprises:
 a second wireless communications link in a second frequency band that is different from the first frequency band; and
 a network of communications nodes selected from the group consisting of: a mesh network, a relay network, a star network, a ring network, and a tree network.

10. A method of operating a communications network to convey Short Message Service (SMS) message data from first user equipment to second user equipment using the Internet Protocol (IP), wherein the communications network comprises an Evolved Packet Data Gateway (ePDG), wireless equipment, and a proxy server, the method comprising:
 with the wireless equipment, receiving a first SMS-over-IP message from the first user equipment over a first communications link having a first bandwidth;
 with the wireless equipment, routing the first SMS-over-IP message to the ePDG; and
 with the proxy server, while the first communications link is unavailable, receiving message data from the first user equipment over a second communications link having a second bandwidth that is less than the first bandwidth.

11. The method of claim 10, further comprising:
 with the proxy server, converting the message data received from the first user equipment into a second SMS-over-IP message; and
 with the proxy server, transmitting the second SMS-over-IP message to the ePDG.

12. The method of claim 11, further comprising:
 with the proxy server, receiving a third SMS-over-IP message from the ePDG, the third SMS-over-IP message comprising SMS message data transmitted by the second user equipment;
 with the proxy server, extracting, from the third SMS-over-IP message, the SMS message data transmitted by the second user equipment;
 with the proxy server, generating a compressed message by encapsulating, using a compression algorithm associated with the second communications link, the SMS message data transmitted by the second user equipment; and
 with the proxy server, transmitting the compressed message to the first user equipment over the second communications link.

13. The method of claim 11, further comprising:
 with the ePDG, receiving the first SMS-over-IP message over a first network tunnel that runs through the wireless equipment and that terminates at the first user equipment and the ePDG; and
 with the ePDG, receiving the second SMS-over-IP message over a second network tunnel that terminates at the proxy server and the ePDG.

14. The method of claim 13, wherein receiving the message data from the first user equipment over the second communications link comprises receiving the message data over a third network tunnel that terminates at the first user equipment and the proxy server.

15. The method of claim 13, wherein the second communications link comprises a wireless communications link having the second bandwidth and a network selected from the group consisting of: a relay network, a mesh network, a star network, a ring network, and a tree network.

16. The method of claim 11, further comprising:
 with the proxy server, receiving carrier configuration file information from a carrier configuration file server;
 with the proxy server, when the first communications link is unavailable, receiving configuration data from the first user equipment over the second communications link;
 with the proxy server, identifying, based on the configuration data and the carrier configuration file information, a network address of the ePDG; and
 with the proxy server, after the network address of the ePDG has been identified, transmitting an authentication request to an authentication server via the ePDG.

17. The method of claim 16, further comprising:
 with the proxy server, receiving a response to the authentication request from the authentication server through the ePDG, the response to the authentication request being addressed to the proxy server;
 with the proxy server, transmitting the response to the authentication request to the first user equipment over the second communications link;
 with the proxy server, receiving a subscriber identity module (SIM) challenge response from the first user equipment over the second communications link;
 with the proxy server, transmitting the SIM challenge response to the authentication server via the ePDG;
 with the proxy server, receiving, via the ePDG, an acknowledgement indicative of the SIM challenge response being verified by the authentication server; and
 with the proxy server and after the acknowledgement has been received, transmitting, via the ePDG and a network tunnel extending from the proxy server to the ePDG, an IP Multimedia Subsystem (IMS) registration request to the authentication server.

18. The method of claim 10, wherein the wireless equipment comprises wireless equipment selected from the group consisting of: a wireless base station and a wireless access point, wherein the first communications link comprises a first wireless link between the wireless equipment and the user equipment, and wherein the second communications link comprises a second wireless link that is different from the first wireless link.

19. A non-transitory computer-readable storage medium storing one or more programs configured to be executed by at least one processor of user equipment having wireless circuitry and a display, the one or more programs including instructions for:
 receiving, using the wireless circuitry, a message from an Evolved Packet Data Gateway (ePDG) over a first communications link, wherein the message includes first message data and wherein the first communications link has a first bandwidth;

receiving, using the wireless circuitry and while the first communications link is unavailable, a compressed message from the ePDG via a proxy server and a second communications link between the proxy server and the user equipment, wherein the second communications link has a second bandwidth that is less than the first bandwidth; and de-encapsulating the compressed message to retrieve second message data from the compressed message.

20. The non-transitory computer-readable storage medium of claim 19, wherein the one or more programs further include instructions for:

displaying the second message data on the display, wherein the first message data comprises first Short Message Service (SMS) data and the second message data comprises second SMS data and wherein the message comprises a Session Initiation Protocol (SIP) message;

transmitting, using the wireless circuitry, an additional SIP message to the ePDG over the first communications link, wherein the additional SIP message includes third SMS message data;

generating an additional compressed message by encapsulating fourth SMS message data; and transmitting, using the wireless circuitry and while the first communications link is unavailable, the additional compressed message to the ePDG via the second communications link and the proxy server.

\* \* \* \* \*